United States Patent [19]
Lohnert et al.

[11] 3,960,656
[45] June 1, 1976

[54] PEBBLE-BED REACTOR

[75] Inventors: Günter Lohnert; Ulrich Müller-Frank, both of Bensberg; Jürgen Heil, Bensberg-Moitzfeld, all of Germany

[73] Assignee: Interatom, Internationale Atomreaktrobau GmbH, Bensberg, Cologne, Germany

[22] Filed: Feb. 13, 1975

[21] Appl. No.: 549,779

[30] Foreign Application Priority Data
Nov. 29, 1974 Germany............................ 2456405

[52] U.S. Cl............................... 176/58 PB; 176/32
[51] Int. Cl.².............................................. G21C 3/44
[58] Field of Search............................... 176/30–32, 176/58, 58 PB, 45–47

[56] References Cited
UNITED STATES PATENTS

| | | | |
|---|---|---|---|
| 2,975,116 | 3/1961 | Daniels | 176/30 |
| 3,034,689 | 5/1962 | Stoughton et al. | 176/31 |
| 3,336,203 | 8/1967 | Rausch et al. | 176/31 |

Primary Examiner—Harvey E. Behrend
Attorney, Agent, or Firm—Kenyon & Kenyon Reilly Carr & Chapin

[57] ABSTRACT

A pebble-bed nuclear reactor of large power rating comprises a container having a funnel-shaped bottom forming a pebble run-out having a centrally positioned outlet. A bed of downwardly-flowing substantially spherical nuclear fuel pebbles is positioned in the container and forms a reactive nuclear core maintained by feeding unused pebbles to the bed's top surface while used or burned-out pebbles run out and discharge through the outlet. A substantially conical body with its apex pointing upwardly and its periphery spaced from the periphery of the container spreads the bottom of the bed outwardly to provide an annular flow down the funnel-shaped bottom forming the run-out, to the discharge outlet. This provides a largely constant downward velocity of the spheres throughout the diameter of the bed throughout a substantial portion of the down travel, so that all spheres reach about the same burned-out condition when they leave the core, after a single pass through the core area.

2 Claims, 3 Drawing Figures

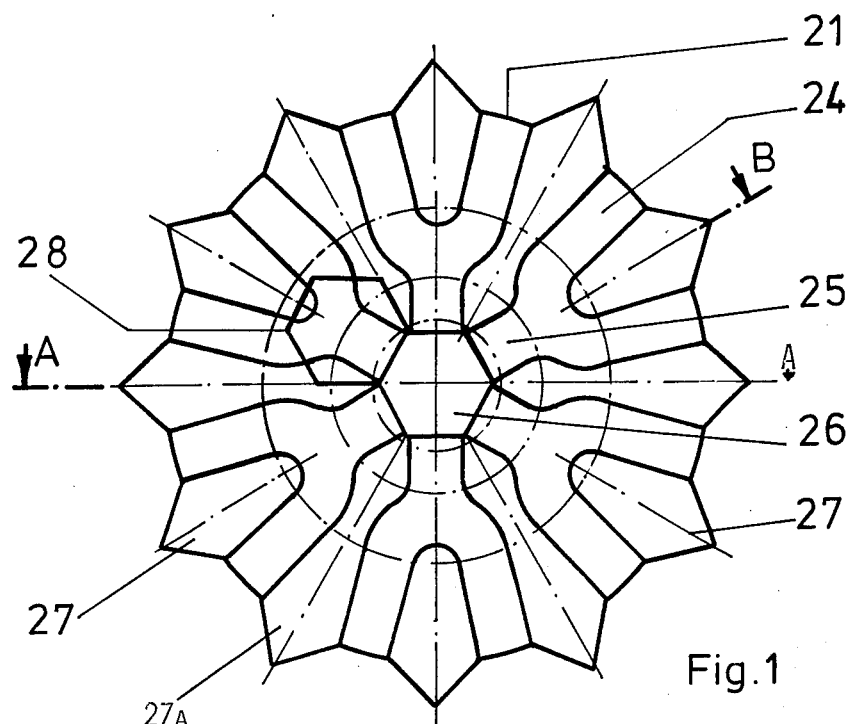
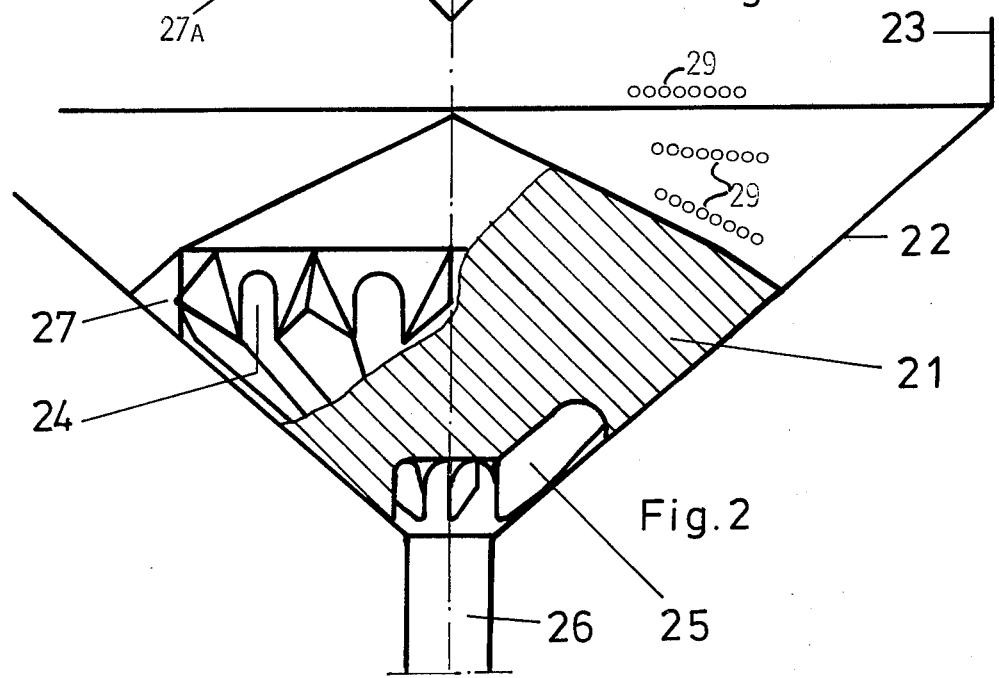

PEBBLE-BED REACTOR

BACKGROUND OF THE INVENTION

There is a type of nuclear reactor, commonly called a pebble-bed reactor, wherein the nuclear fuel is in the form of relatively small spheres which are formed into a bed in a container having a bottom with a discharge outlet for the pebbles. Unused pebbles are fed to the top of the bed, and with the bed gradually flowing downwardly used or burned-out pebbles are discharged by way of the run-out. Control rods are inserted vertically into the bed as required to control the activity rate and a gas-coolant is flowed through the bed and passages in the container's core.

A small experimental reactor of this kind, the so-called AVR reactor in Juelich, is described in the journal "Atomwirtschaft," 1966, No. 5, on pages 218 to 271. Another pebble-bed reactor of this kind, the so-called THTR reactor in Uentrop, is described in "Atomwirtschaft" of May 1971, on pages 235 to 246. On page 237, reference is made, as a desirable further development of these two reactors, to the so-called Otto Program (once through, then out), in which the fuel elements travel through the core only once from the top to the bottom. In this program, however, the fuel elements of the first core would have to have differently enriched uranium for immediate operation at full load, according to their position in the core, but the fuel elements which need to be refilled according to the burnup can have the same enrichment. The fuel elements withdrawn from the core would then be burned up and could be removed from circulation. The charging in operation and the withdrawal arrangement could then be kept very simple, as the reshuffling of the core and the measurement of the burnup could be eliminated. Appropriate investigations are being carried out at the Nuclear Research Facility Juelich. The further advantages of this Otto Program are described in detail in the German Offenlegungsschrift 21 23 894.

The AVR as well as the THTR reactor have a container forming a cylindrical core which in its lower part changes into a funnel at whose lower tip a discharge arrangement for the fuel spheres is located. The experiments with such a single, central discharge arrangement, however, have shown so far that the desired Otto Program cannot be realized by this discharge arrangement alone in a manner that makes sense from a core-technology point of view. With continuous withdrawal of the fuel spheres with a mean velocity, relative to the core cross section, of about 0.5 cm/d, the velocity of the spheres is about six times greater in the central region of the core than in the outer zones. One would therefore either have to be satisfied with less burnup for the fuel spheres in the central region of the reactor, or these spheres would have to be fed back into the reactor from the top, abandoning thereby the essential advantages of the so-called Otto Program, i.e., burnup which is uniform over the cross section. In order to improve the uniform withdrawal of the spheres over the core cross section, it has already been attempted to arrange in the lower part of the core three or more withdrawal arrangements, several of which are always arranged on a radius. Apart from the fact that the number of these sphere withdrawal devices cannot be increased arbitrarily, because these withdrawal devices cause a considerable expenditure of means design-wise and therefore, substantial costs, tests in that direction have shown that increasing the number of withdrawal devices still does not ensure the desired uniform flow of the spheres.

SUMMARY OF THE INVENTION

It is therefore an object of the present invention to avoid the short-comings connected with the non-uniform flow of the spheres and to achieve approximately constant vertical velocity of the spheres over the cross section with small design means.

To solve this problem, an arrangement for equalizing the flow of spheres in a pebble-bed reactor of large power rating is used, in which in a funnel-shaped run-out, known per se, at the bottom of the core an inner conical body is arranged with the apex pointing upward in such a way that the spheres can flow to a central outflow underneath this body. This body should have approximately rotation-symmetrical shape with respect to its vertical axis. In view of its fabrication of a very heat-resistant material, e.g., graphite, its cross section may also have the shape of a regular polygon. Model tests have shown that with this arrangement, a largely constant vertical velocity of the spheres in the core is obtained, at least until the spheres in their downward movement reach a position which corresponds to a height of about 0.2 of the core diameter or less. This means that one should strive for a height-diameter ratio of the pouring height of the spheres in the core as large as possible, so that this position is reached as late as possible.

As the pressure losses of the coolant within the fuel bed depend on the core height as the third power, the height cannot be increased arbitrarily when the thermal power of a pebble-bed reactor is increased. Therefore, a pebble-bed reactor of higher power rating must of necessity have a smaller height-diameter ratio. This fact underscores the necessity of a flow of the spheres as uniform as possible in reactors of larger rating.

In a special embodiment of the invention, where the core container is of cylindrical shape, it is proposed that the inner conical body has a diameter which is about one-half of the cylindrical core diameter.

It is another advantage of the arrangement according to the invention that through the diameter of the inner conical body, a velocity profile that may be desired can be produced over the reactor cross section. The larger the diameter of the inner conical body is chosen relative to the core diameter, the greater becomes the velocity of the spheres in the edge zone as compared to the spheres in the central region of the core.

The core container and its funnel-shaped bottom or runout is made of graphite as is the conical body and the reacting pebble-bed receives a major portion of the weight of the bed. At the same time, the conical body must be supported by the runout surface in such a way as to permit the used or burned-up pebbles to flow to the run-out's central discharge as freely as possible and without localized accumulations, to the fullest extent possible.

Because of the heat involved, the construction must be made of highly heat-resistant material, particularly graphite, such materials ordinarily being able to carry high compressive stress but being relatively weak insofar as tensile stresses are concerned. Therefore, supports such as must be used to position the conical body above the run-out should act as columns working in compression as much as possible, thus limiting the horizontal and transverse spacing of the supports, to a substantial extent.

Therefore, another object of the present invention is to provide a design of support construction satisfying the initially stated object while at the same time providing for a multiplicity of support members which are interspaced closely so that all unsupported spans of the body which are necessarily subjected to beam stress, are kept very small in extent.

To attain this secondly stated object, a multiplicity of radially extending webs are provided between the bottom of the conical body and the run-out surface, thus forming radial passages leading to the central opening or outlet of the run-out surface. These webs and channels are designed so that, acting as interspaced columns which are radially elongated, the channels or passages are formed by groups of two each with the passages joining together to form single passages leading inwardly to the central discharge outlet of the run-out.

In addition, the invention makes it possible to have each two groups of two passages which merge to form two single channels, have these two channels, in turn, merge together to form the single channel or passage leading to the discharge outlet. In this way the portion of the conical body directly above the discharge outlet, is supported by a multiplicity of column portions, formed by the supporting webs, which are positioned as close as possible to the area of the conical body above the discharge outlet.

With the present invention both objects stated hereinabove are achieved. The channels or passages can be designed so that the fuel spheroids or pebbles flow uniformly from the annular space between the body and the run-out and the container, as uniformly as possible to the central discharge outlet. The flow resistance can be made the same for all of the pebbles from the circumference of the conical body to the central discharge point. All of the channels or passages can be made with substantially the same cross sections and substantially the same lengths so that the same angle and number of the necessary flow directing areas can be the same throughout.

BRIEF DESCRIPTION OF THE DRAWINGS

The accompanying drawings schematically show only the parts required to explain the present invention, the various figures being as follows:

FIG. 1 is a view showing the bottom of the conical body to illustrate the webs and channels;

FIG. 2 is a cross section on the line A—A in FIG. 1; and

DETAILED DESCRIPTION OF THE INVENTION

Figure 3:
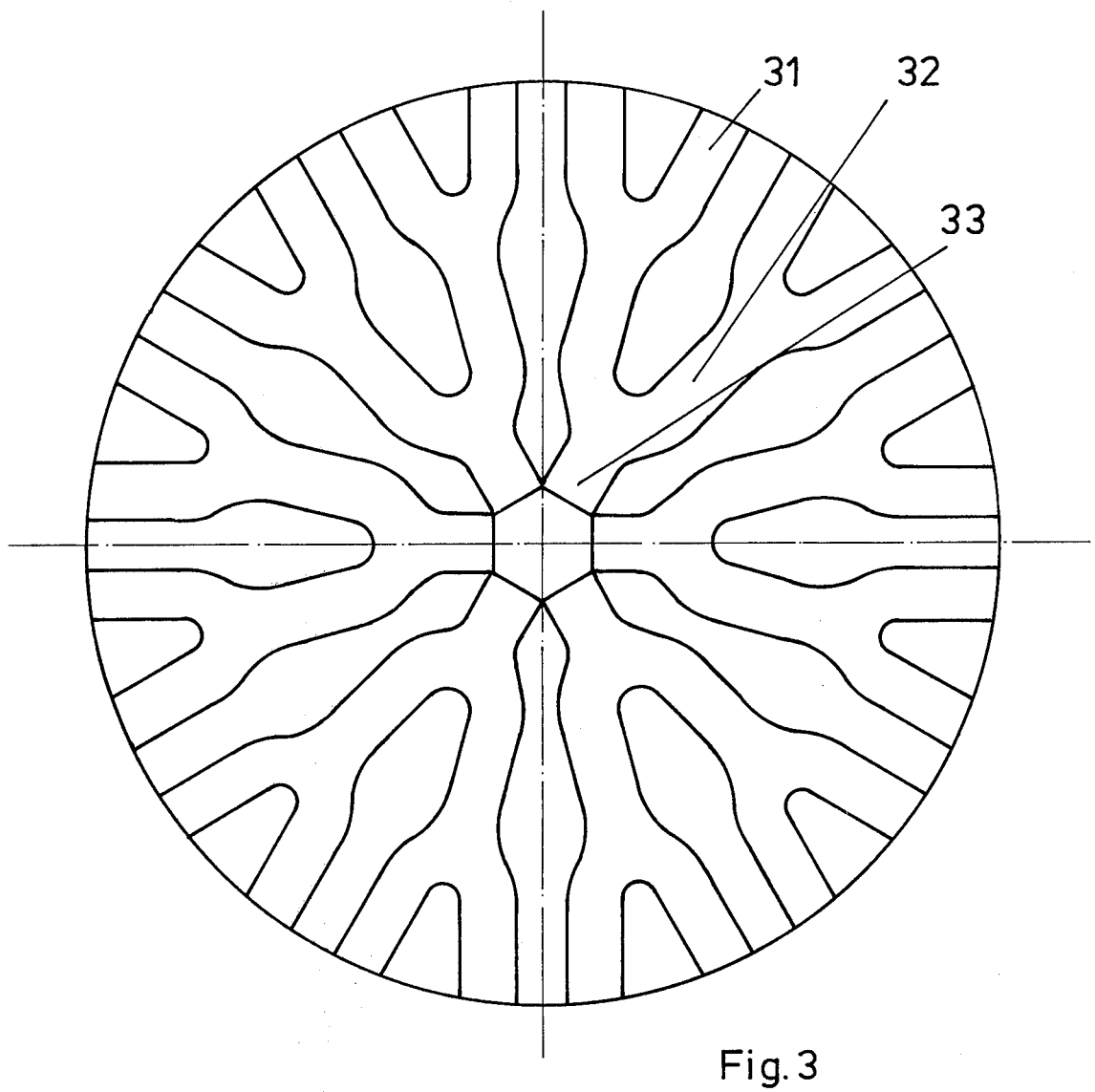
FIG. 3 is similar to FIG. 1 but shows a modification.

FIGS. 1 and 2 show essentially only the conical body embodying the principles of the present invention, but FIG. 2 does show the funnel-shaped bottom or run-out 22 of the cylindrical core container 23 which contains the pebble-bed reacting to provide useful heat carried away by a gas coolant. The substantially conical-shaped body which diverts the downward flow of the bed is shown at 21. This body should be positioned with its apex upwardly and its periphery should be of less extent that of the container 23 to permit the pebble run-out.

As shown, the conical bottom of the body 21 has a plurality of mutually interspaced columns 27 and 27a extending from the core container's bottom 22 upwardly to the body 21. These columns are radially elongated to form webs converging towards the outlet 26 centrally located within the run-out 22 and these webs 27 and 27a are shaped to define groups of radial passages 24 extending from the periphery of the body 21 to the outlet 26 and converging to join together to form, as to each group, a single common passage 25 while approaching and leading to the run-out outlet 26. It can be seen that the converging webs 27 and 27a provide vertical columns between the body 21 and the run-out surface 22 which carry the weight of the pebble bed resting on the conical top of the body 21, and that these elongated columns or web-like columns are closely interspaced and in the case of the columns 27a extend right up to the discharge outlet or opening 26 of the run-out 22. The roof-like portions which extend over the passages 24 are also of reduced circumferential length, the graphite material, therefore, operating under compression stress to a very substantial extent. Because the passages or channels 24 are formed in the body 21, the radially extending or outward terminations of the radially elongated column portions 27 and 27a inherently are streamlined or pointed, avoiding or reducing the possibility of pebble accumulations at those points.

More specifically, as shown by FIG. 1, there are twelve of the channels 24 or six groups of two channels each. About halfway in from the radius of the conical body, the two channels of each group are brought together to form the single channels 25, of which there are, of course, six. The contours of the channels, as provided by the elongated columns or webs 27 and 27a, may be rounded or streamlined to avoid clogging by the pebbles. The central outlet 26 is initially hexagonal in shape but can thereafter change to a cylindrical shape.

To carry this concept further, in FIG. 3 the groups of two channels each are shown at 31 as being in pairs to form groups of channels or passages having four entrances, which in the case of each two, converge at 32 to form single channels which continue to converge until at 33 they join to become one of the six channels corresponding to those shown at 25 in FIG. 1.

As indicated at 28, the conical body may be made of interfitted, vertically arranged graphite blocks or forms of hexagonal cross section, resulting in the channel outlets defining a corresponding shape, this being the reason the run-out outlet, at least at its mouth, is correspondingly hexagonal. The downwardly-flowing pebble-bed 29, only generally indicated by the circles, is supported to a considerable extent by the body 21 which, in turn, is supported by the column portions or webs between which the described channels are defined. The outer ends of these webs are pointed, for pebble-flow streamlining, because the conical body has a conical bottom also, and the channels are preferably formed in this bottom.

What is claimed is:

1. A pebble-bed nuclear reactor or large power rating, comprising a container have a funnel-shaped bottom forming a pebble run-out having a centrally positioned outlet, a bed of downwardly-flowing substantially spherical nuclear fuel pebbles in said container and forming a reactive nuclear core maintained by feeding said pebbles to the bed's top surface while used pebbles run out down said bottom forming said run-out and discharge through said outlet, a substantial conical body having a periphery of less extent than that of said container, and means for positioning said body in said run-out with the body's apex pointing upwardly and the body's said periphery horizontally spaced from said container's periphery and so as to permit said pebbles to flow under said body on said funnel-shaped bottom to and through said outlet, said means being formed by a plurality of mutually interspaced columns extending from said bottom upwardly to said body and said columns being radially elongated to form webs converging towards said outlet, said webs being shaped to define groups of radial passages extending from said peripheries to said outlet and converging to join together to form a single common passage while approaching said outlet.

2. The reactor of claim 1 in which each of said groups is formed by two of said passages and as to each mutually adjacent two of said groups their said common passages join together adjacent to said outlet.

* * * * *